United States Patent
G V et al.

(10) Patent No.: US 8,515,633 B2
(45) Date of Patent: Aug. 20, 2013

(54) CONTROL SYSTEM AND METHOD FOR SHIFT QUALITY AND PERFORMANCE IMPROVEMENT IN MANUAL TRANSMISSIONS USING ENGINE SPEED CONTROL

(75) Inventors: Ravikanth G V, Bangalore (IN); Aurobbindo Lingegowda, Bangalore (IN); Atul Kumar Agrawal, Bangalore (IN); Awadesh Tiwari, Bangalore (IN)

(73) Assignee: GM Global Technology Operations LLC

( * ) Notice: Subject to any disclaimer, the term of this patent is extended or adjusted under 35 U.S.C. 154(b) by 346 days.

(21) Appl. No.: 12/830,745

(22) Filed: Jul. 6, 2010

(65) Prior Publication Data

US 2012/0010796 A1 Jan. 12, 2012

(51) Int. Cl.
*B60W 30/19* (2012.01)
*B60W 50/00* (2006.01)

(52) U.S. Cl.
CPC ........... *B60W 30/19* (2013.01); *B60W 50/0097* (2013.01)
USPC .................. 701/54; 701/51; 701/70; 701/102

(58) Field of Classification Search
CPC .......................... B60W 30/19; B60W 50/0097
USPC ............... 701/66, 70, 110, 51, 54; 123/319; 477/107, 109, 111
See application file for complete search history.

(56) References Cited

U.S. PATENT DOCUMENTS

| | | | | |
|---|---|---|---|---|
| 4,266,447 A | * | 5/1981 | Heess et al. | 477/101 |
| 4,517,646 A | * | 5/1985 | Magnusson et al. | 701/64 |
| 5,582,558 A | * | 12/1996 | Palmeri et al. | 477/109 |
| 5,679,093 A | * | 10/1997 | Desautels et al. | 477/109 |
| 5,941,922 A | * | 8/1999 | Price et al. | 701/51 |
| 6,997,074 B2 | * | 2/2006 | Wadas et al. | 74/335 |
| 7,468,018 B2 | * | 12/2008 | Radich | 477/78 |
| 2008/0255738 A1 | * | 10/2008 | Murayama et al. | 701/54 |
| 2010/0197458 A1 | * | 8/2010 | Turski et al. | 477/109 |
| 2011/0040461 A1 | * | 2/2011 | Wolterman | 701/51 |

* cited by examiner

*Primary Examiner* — James Trammell
*Assistant Examiner* — Todd Melton

(57) ABSTRACT

A control system for an engine of a vehicle includes a shift forecasting module that forecasts one of an upshift and a downshift of a manual transmission based on vehicle acceleration, clutch pedal position, acceleration pedal position and brake pedal position. A gear state calculating module determines a current gear state based on a speed of the engine and a speed of the vehicle. A next gear state calculating module determines a next gear state. The next gear state is based on the current gear state and the one of the upshift and downshift. A next engine speed calculating module estimates an estimated engine speed based on the next gear state and the vehicle speed. An engine speed control module adjusts the engine speed based on the estimated engine speed.

6 Claims, 3 Drawing Sheets

CONTROL SYSTEM AND METHOD FOR SHIFT QUALITY AND PERFORMANCE IMPROVEMENT IN MANUAL TRANSMISSIONS USING ENGINE SPEED CONTROL

FIELD

The present disclosure relates to control systems, and more particularly to engine speed control systems for internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Shifting in vehicles with a manual transmission requires driver skill for relatively smooth shifts. For a downshift, the clutch is applied and the manual transmission moves through neutral before engaging another gear. For smoother downshifts, some drivers rev the engine while the transmission is in neutral to speed up the engine. This allows the engine speed to match the transmission speed. During downshifts, the driver is seldom successful at matching the engine speed with the transmission speed by revving the engine and simultaneously engaging the clutch.

When shifting to a higher gear, the driver applies the clutch and moves through neutral before selecting the next higher gear. While in neutral, the engine slow downs to a proper speed to engage the transmission. The vehicle also slows while the transmission is in neutral. The time in neutral may depend on the grade, wind, driver skill and other similar factors. The performance and fuel economy of the vehicle tends to degrade as the driver spends more time in neutral to match the engine speed with the transmission speed.

SUMMARY

A control system for an engine of a vehicle includes a shift forecasting module that forecasts one of an upshift and a downshift of a manual transmission based on vehicle acceleration, clutch pedal position, acceleration pedal position and brake pedal position. A gear state calculating module determines a current gear state based on a speed of the engine and a speed of the vehicle.

In other features, a next gear state calculating module determines a next gear state. The next gear state is based on the current gear state and the one of the upshift and downshift. A next engine speed calculating module estimates an estimated engine speed based on the next gear state and the vehicle speed. An engine speed control module adjusts the engine speed based on the estimated engine speed.

In other features, the shift forecasting module is enabled when the clutch pedal position indicates that a clutch pedal is applied. A vehicle acceleration module generates the vehicle acceleration based on the vehicle speed.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
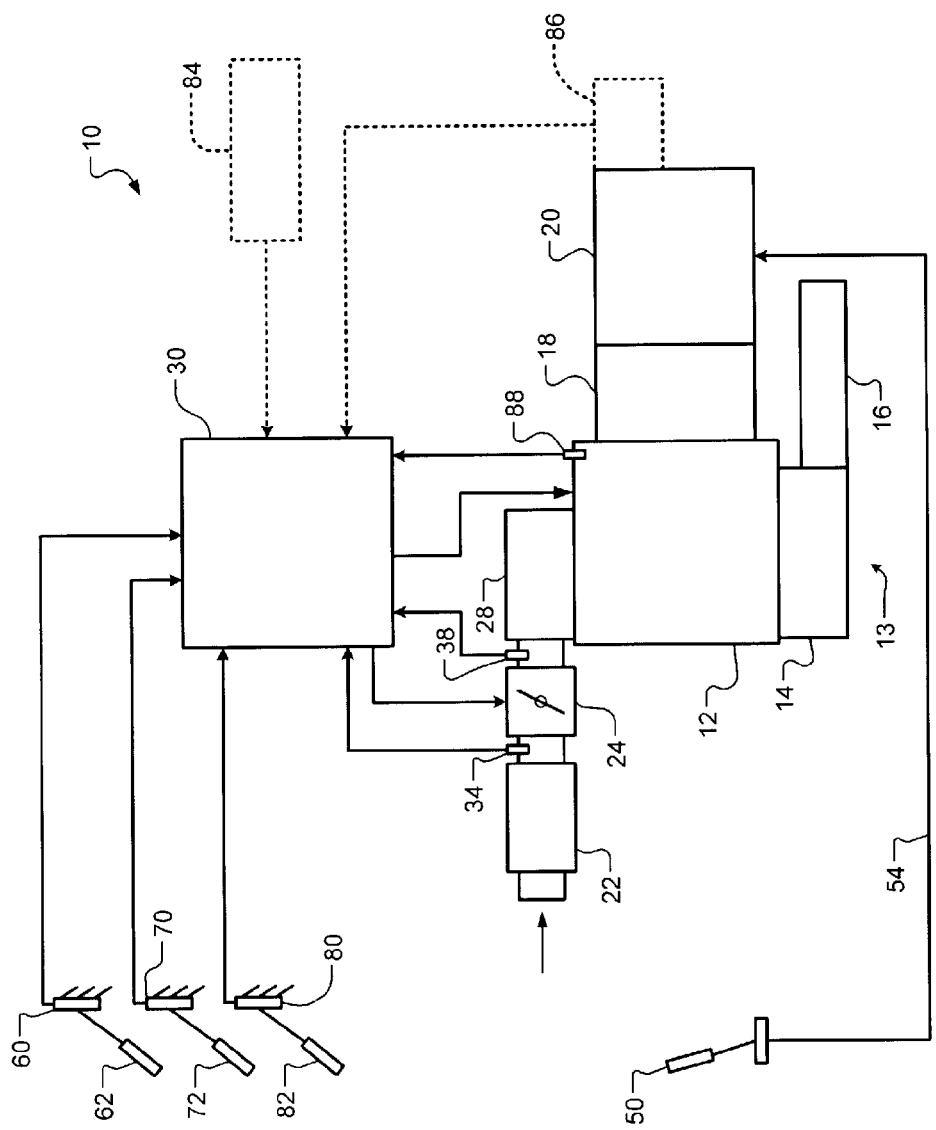
FIG. 1 is a functional block diagram of an engine control system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure relates to a control system and method that forecasts whether an upshift or downshift will occur. The forecast may be based on driver inputs to an accelerator pedal, a clutch pedal and/or a brake pedal and vehicle acceleration. The forecast may also occur when the clutch is applied. The present disclosure also estimates a current gear state of the vehicle (when the clutch is initially applied) from the vehicle speed and engine speed (using a back calculation). With the knowledge of upshift/downshift and the current gear, the present disclosure estimates the next gear state and the expected engine speed for the next gear (using a forward calculation). The amount of fuel that is supplied is controlled such that the actual engine speed matches the estimated engine speed for the next gear.

Referring now to FIG. 1, an engine control system according to the present disclosure is shown. A vehicle 10 includes an engine 12 that is selectively coupled by a clutch 18 to a manual transmission 20. The engine 12 can be a spark ignition engine, a diesel engine, a homogenous charge compression engine and/or any other suitable engine. Air is drawn into the engine 12 through a filter 22 and a throttle 24 into an intake manifold 28. The throttle can be a mechanical throttle (not shown) with direct linkage to the accelerator pedal or an electronic throttle (shown).

Air in the intake manifold passes through intake valves (not shown) into cylinders (not shown) of the engine 12. Spark plugs ignite the air/fuel mixture in a spark ignition engine. Alternately, compression may ignite the air/fuel mixture in a diesel engine. After combustion, exhaust gas flows through exhaust valves (not shown) into an exhaust system 13 that includes an exhaust manifold 14 and an exhaust 16. The exhaust system 13 may also include exhaust treatment devices such as catalytic converters (not shown) or other devices.

A control module 30 controls operation of the engine 12 using various sensor inputs. For example only, the control module 30 may receive an intake air temperature (IAT) signal from an IAT sensor 34 and a mass airflow (MAF) signal from a MAF sensor 38.

A gear shifter 50 may be connected by mechanical linkage 54 to the transmission 20 to allow the operator of the vehicle 10 to select one of a plurality of gears. An accelerator pedal assembly 60 includes an accelerator pedal 62 and a sensor (not shown) that monitors a position of the accelerator pedal 62. A brake pedal assembly 70 includes a brake pedal 72 and a sensor (not shown) that monitors a position of the brake pedal 72. A clutch pedal assembly 80 includes a clutch pedal 82 and a sensor (not shown) that monitors a position of the clutch pedal 82.

The control module 30 also receives a vehicle speed input. For example only, the vehicle speed input may be based on an output of an antilock braking system (ABS) 84, a transmission output speed sensor (TOSS) 86, and/or any other suitable vehicle speed sensor. Likewise, the control module 30 receives an engine speed signal based on an output of an engine speed sensor 88.

Figure 2:
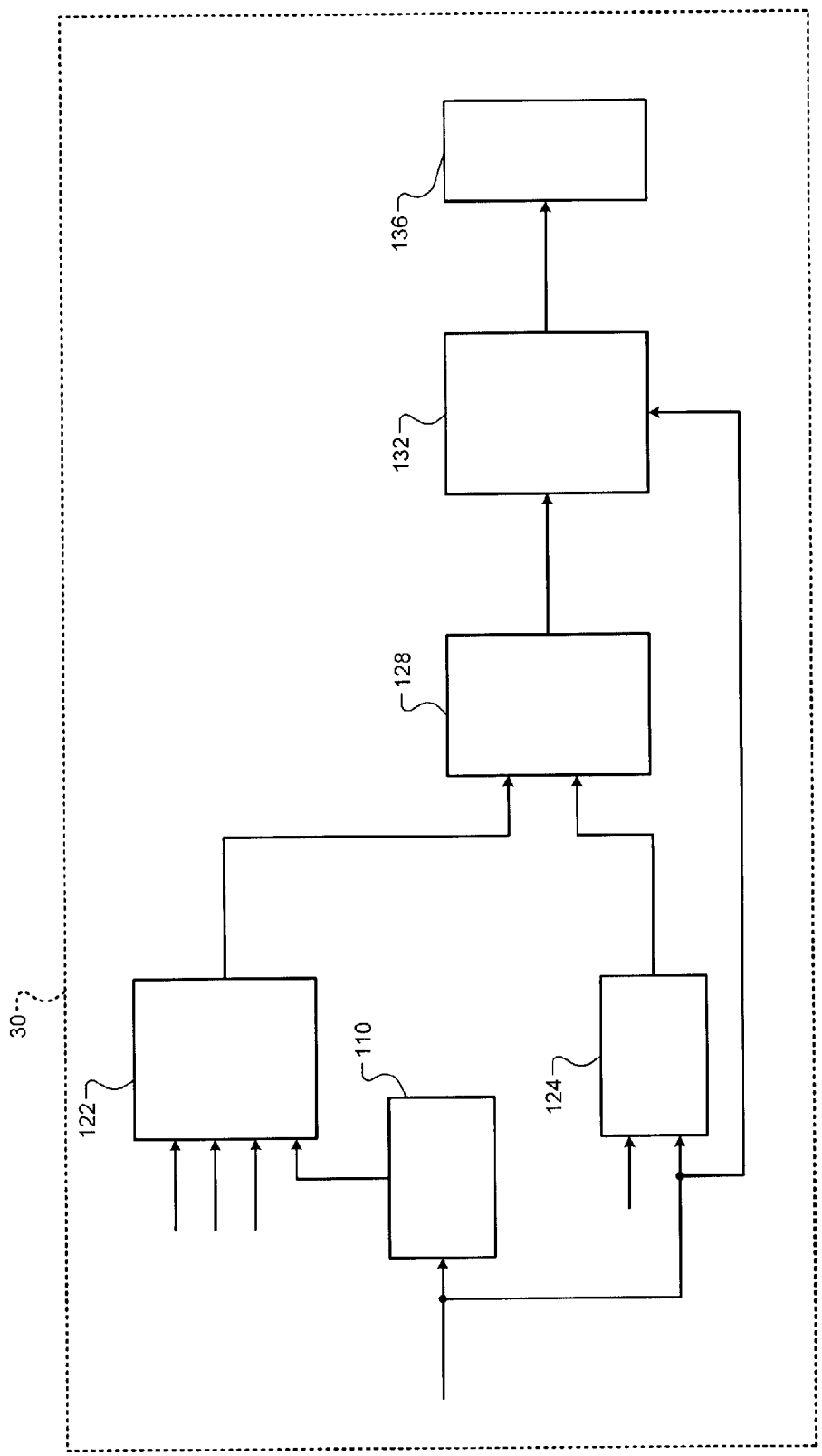
FIG. 2 is a functional block diagram of a control module according to the present disclosure.

Referring now to FIG. 2, an exemplary implementation of the control module 30 according to the present disclosure is shown. The control module includes a vehicle acceleration calculating module 110 that calculates vehicle acceleration based on the sensed vehicle speed. When the clutch is applied, a shift forecasting module 122 determines whether an upshift or a downshift will occur based upon clutch position, accelerator position, brake position and/or vehicle acceleration.

In some implementations, the clutch pedal position, accelerator pedal position, brake pedal position and vehicle acceleration are binary values. In other implementations, position signals indicating a relative position may be used. For example only, the clutch pedal position, accelerator pedal position and brake pedal position indicate whether the respective pedals are applied or released. The vehicle acceleration may be classified into a positive range, a negative range and a zero range. The zero range may include a range of values around zero acceleration.

A current gear state calculator 124 determines a current gear state based upon engine speed and vehicle speed. The current gear state calculation may be performed at predetermined times. The current gear state calculation that is used is a value calculated immediately before the clutch is disengaged. Once the clutch is disengaged, the vehicle speed to engine speed may not match with any of the gear ratios.

A next gear state calculating module 128 determines a next gear state based upon the upshift/downshift output from the upshift/downshift forecasting module and the current gear state output by the gear state calculating module 124. A next engine speed calculating module 132 calculates an estimated engine speed based upon the next gear state output by the next gear state calculating module 128. An engine speed control module 136 controls the engine speed based upon the estimated engine speed.

Figure 3:
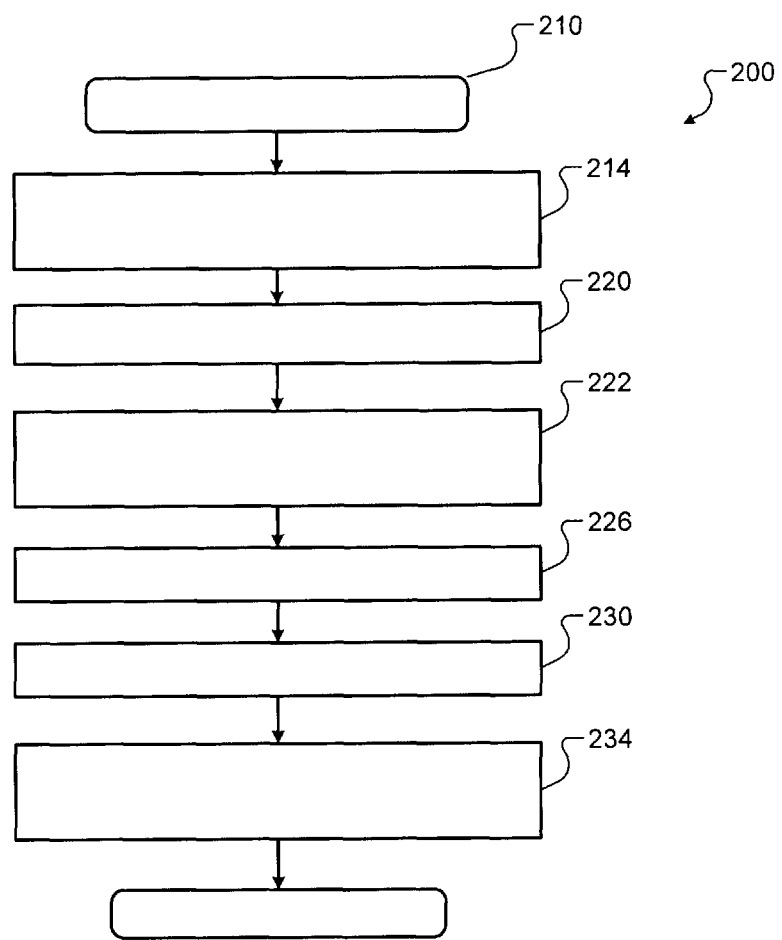
FIG. 3 illustrates a method for controlling engine speed according to the present disclosure.

Referring now to FIG. 3, a method 200 for controlling engine speed according to the present disclosure is shown. Control begins at 210. At 214, the position of the clutch, brake and accelerator pedals is sensed. When the clutch is applied, an upshift or downshift is forecasted at 220. At 222, a current gear is determined from the vehicle speed and the engine speed. At 226, the next gear state is forecasted. At 230, the engine speed is estimated based upon the next gear state. At 234, the engine speed is adjusted to match the estimated engine speed.

| S. No. | Clutch | Brake | Accelerator | Acceleration | Shift |
|---|---|---|---|---|---|
| 1 | 1 | 0 | 0 | Negative | Down Shift |
| 2 | 1 | 0 | 0 | Positive | Down Shift (Coasting) |
| 3 | 1 | 0 | 1 | Negative | Down Shift (Up Hill + Higher Gear) |
| 4 | 1 | 0 | 1 | Zero | Up Shift (Cruising) |
| 5 | 1 | 0 | 1 | Positive | Up Shift (Accelerating) |
| 6 | 1 | 1 | 0 | Negative | Down Shift (Decelerating) |
| 7 | 1 | 1 | 0 | Zero | Down Shift (Coasting) |
| 8 | 1 | 1 | 0 | Positive | Down Shift (Coasting) |

The table shown above may be used to determine whether an upshift or downshift should occur. The upshift or downshift determination may be based on clutch, brake and accelerator pedal positions and vehicle acceleration. The forecast can be initiated after the clutch pedal is applied. Based on these inputs, an upshift or downshift action can be predicted as will be described further below.

For example only, when the clutch is applied, the brake and accelerator pedals are not applied, and the vehicle acceleration is in the negative range, a downshift can be predicted. Therefore, the engine speed may be predicted based on this anticipated downshift state.

For example only, when the clutch is applied, the brake and accelerator are not applied, and the vehicle acceleration is in the positive range, a downshift (coasting) can be predicted. Therefore, the engine speed may be predicted based on this anticipated downshift state.

For example only, when the clutch is applied, the brake pedal is not applied, the accelerator is applied, and the vehicle acceleration is in the negative range, a downshift (going up hill in a higher gear) can be predicted. Therefore, the engine speed may be predicted based on this anticipated downshift state.

For example only, when the clutch is applied, the brake pedal is not applied, the accelerator pedal is applied, and vehicle acceleration is in the zero range, an upshift (cruising) is predicted. Therefore, the engine speed may be predicted based on this anticipated upshift state.

For example only, when the clutch is applied, the brake pedal is not applied, the accelerator pedal is applied, and vehicle acceleration is in the positive range, an upshift (accelerating) is predicted. Therefore, the engine speed may be predicted based on this anticipated upshift state.

For example only, when the clutch is applied, the brake pedal is applied, the accelerator pedal is not applied, and vehicle acceleration is in the negative range, a downshift (decelerating) is predicted. Therefore, the engine speed may be predicted based on this anticipated downshift state.

For example only, when the clutch is applied, the brake pedal is applied, the accelerator pedal is not applied, and the vehicle acceleration is in the zero range, a downshift (coasting) is predicted. Therefore, the engine speed may be predicted based on this anticipated downshift state.

For example only, when the clutch is applied, the brake pedal is applied, the accelerator pedal is not applied, and vehicle acceleration is in the positive range, a downshift (coasting) is predicted. Therefore, the engine speed may be predicted based on this anticipated downshift state.

The control system according to the present disclosure reduces jerk observed in manual transmissions during shifts. The control system also tends to reduce wear and tear of clutch friction material due to reduced slipping. The control system tends to improve fuel economy as the increase in engine speed is performed at low load, in other words when the engine is disengaged from the transmission. The control system is a low cost solution for shift quality improvement in manual transmissions.

The control system according to the present disclosure also improves the performance of the vehicle during maneuvering and on grades. The control system does not require additional hardware to be added. The control system also makes driving easier as compared to other manual transmissions that demand a higher level of driver skill.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine of a vehicle, comprising:
    a shift forecasting module that forecasts one of an upshift and a downshift by an operator of a manual transmission based on vehicle acceleration, clutch pedal position, acceleration pedal position and brake pedal position;
    a gear state calculating module that determines a current gear state based on a speed of the engine and a speed of the vehicle;
    a next gear state calculating module that determines a next gear state based on the current gear state and the one of the upshift and downshift;
    a next engine speed calculating module that estimates an estimated engine speed based on the next gear state and the vehicle speed; and
    an engine speed control module that adjusts the engine speed based on the estimated engine speed.

2. The control system of claim 1, wherein the shift forecasting module is enabled when the clutch pedal position indicates that a clutch pedal is applied.

3. The control system of claim 1 further comprising a vehicle acceleration module that generates the vehicle acceleration based on the vehicle speed.

4. A method for controlling an engine of a vehicle, comprising:
    forecasting one of an upshift and a downshift of a manual transmission by an operator based on vehicle acceleration, clutch pedal position, acceleration pedal position and brake pedal position;
    determining a current gear state based on a speed of the engine and a speed of the vehicle;
    determining a next gear state based on the current gear state and the one of the upshift and downshift;
    estimating an estimated engine speed based on the next gear state and the vehicle speed; and
    adjusting the engine speed based on the estimated engine speed.

5. The method of claim 4, further comprising enabling shift forecasting when the clutch pedal position indicates that a clutch pedal is applied.

6. The method of claim 4 further comprising generating the vehicle acceleration based on the vehicle speed.

* * * * *